(12) United States Patent  
Diorio et al.

(10) Patent No.: US 8,115,590 B1  
(45) Date of Patent: *Feb. 14, 2012

(54) RFID READERS LIMITING THEFT OF CONFIDENTIAL INFORMATION

(75) Inventors: Christopher J. Diorio, Shoreline, WA (US); Joel Peshkin, San Juan Capistrano, CA (US); Ali Aiouaz, Mission Viejo, CA (US); Scott Cooper, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 434 days.

This patent is subject to a terminal disclaimer.

(21) Appl. No.: 12/370,907

(22) Filed: Feb. 13, 2009

Related U.S. Application Data

(60) Provisional application No. 61/039,040, filed on Mar. 24, 2008.

(51) Int. Cl.  
*G05B 19/00* (2006.01)

(52) U.S. Cl. ...................................... 340/5.2; 340/10.51

(58) Field of Classification Search ............... 340/572.1, 340/10.1, 10.5, 10.51, 5.2, 5.4, 5.8; 380/270  
See application file for complete search history.

(56) References Cited

U.S. PATENT DOCUMENTS

| | | | |
|---|---|---|---|
| 5,952,922 A * | 9/1999 | Shober | 340/10.5 |
| 6,677,852 B1 * | 1/2004 | Landt | 340/10.1 |
| 7,450,010 B1 * | 11/2008 | Gravelle et al. | 340/10.1 |
| 2006/0032901 A1 * | 2/2006 | Sugiyama et al. | 340/10.1 |
| 2007/0013487 A1 * | 1/2007 | Scholtz et al. | 340/10.51 |
| 2008/0094220 A1 * | 4/2008 | Foley et al. | 340/10.3 |

* cited by examiner

*Primary Examiner* — Thomas Mullen  
(74) *Attorney, Agent, or Firm* — Turk IP Law, LLC

(57) ABSTRACT

RFID reader and methods of operating an RFID reader are provided to limit or prevent the issuing of confidential information such as encryption keys, passwords, shared secrets, and the like to RFID tags if a reader is not authorized. The reader may determine its authorization status based on a self-check, information from another reader, or information from a controller, and limit an operational aspect of itself or for communication with the tags.

19 Claims, 12 Drawing Sheets

READER METHODS

RFID READER SYSTEM DETAIL

*READER OPERATION LIMITATION BASED ON AUTHORIZATION STATUS 1*

*READER OPERATION LIMITATION BASED ON AUTHORIZATION STATUS 2*

READER OPERATION LIMITATION
BASED ON AUTHORIZATION STATUS 3

ARCHITECTURE OF INTERFACE CONVERTER WITH AGENT AND UTILITY

SAMPLE SCREENSHOT OF INTERFACE CONVERTER EXPOSING TO AGENT OPTIONS TO CONTROL FUNCTIONALITY OF UTILITY

RFID READERS LIMITING THEFT OF CONFIDENTIAL INFORMATION

CROSS REFERENCE TO RELATED APPLICATIONS

This application claims the benefit of U.S. Provisional Patent Application Ser. No. 61/039,040 filed on Mar. 24, 2008. The disclosure of the provisional patent application is hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

RFID readers may issue confidential information such as encryption keys, passwords, specific commands, and so on, to tags. This confidential information may be used to encrypt or decrypt messages, to lock or unlock tag memory, or to perform a specific operation on the tag, and may be intrinsically confidential such as financial information, and so on. The confidential information may be sent one time, or updated occasionally or regularly. Readers which legitimately have access to this confidential information may be stolen, or an illegitimate reader (also known as a rogue reader) may be inserted into a multi-reader system to gain nefarious access to this confidential information.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID reader and methods of operating an RFID reader to limit or prevent the issuing of confidential information such as encryption keys, passwords, shared secrets, and the like, to tags if a reader is not authorized. According to some embodiments, the reader may determine its authorization status based on a self-check, information from another reader, or information from a controller, and limit an operational aspect of itself or for communication with the tags.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying Drawings, in which.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

Figure 1:
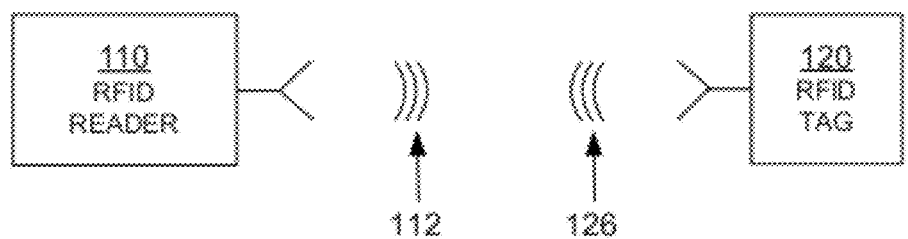
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are in a suitable range of frequencies. Such ranges include those near 900 MHz, 2.4 GHz, and so on.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e., having its own power source. Where tag 120 is a passive tag, it is powered from wave 112.

Figure 2:
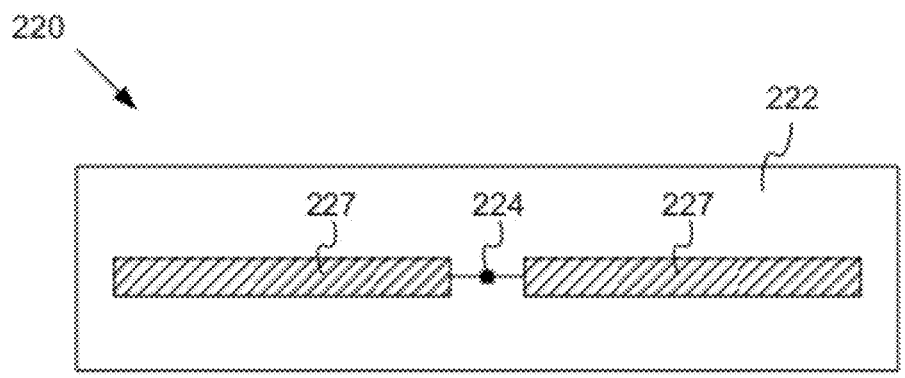
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
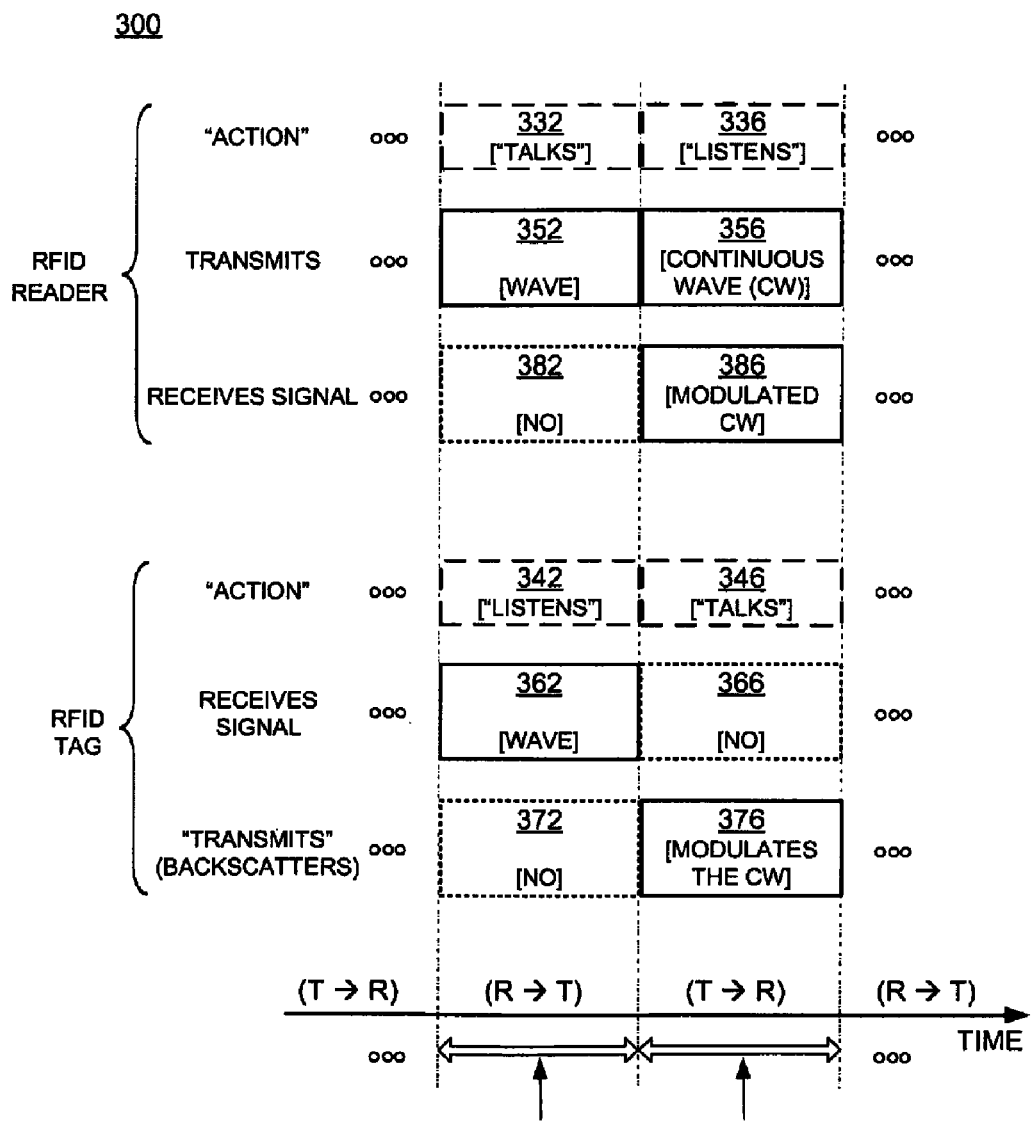
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are described in protocols. A protocol is a specification that calls for specific manners of signaling between the reader and the tags.

One such protocol is called the Specification for RFID Air Interface—EPC (TM) Radio-Frequency Identity Protocols Class-1 Generation-2 UHF RFID Protocol for Communications at 860 MHz—960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

In addition, a protocol can be a variant of a stated specification such as the Gen2 Spec, for example including fewer or additional commands than the stated specification calls for, and so on. In such instances, additional commands are sometimes called custom commands.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

Reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, tag 120 can respond with a backscatter that is modulated onto a frequency, developed by tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

Embodiments of the present disclosure can be useful in different RFID environments, for example, in the deployment of RFID readers in retail environments, in point-of-sale environments, in the environments of financial institutions, in environments of data-management institutions, in library environments, in environments related to returnable objects or assets, and the like.

Figure 4:
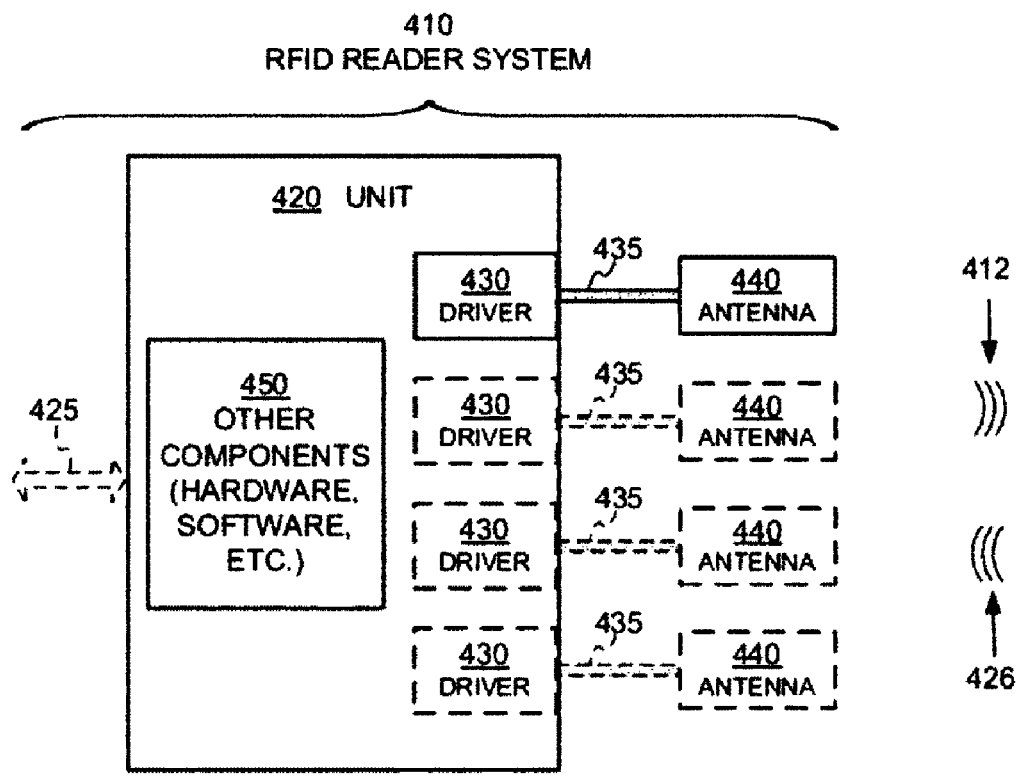
FIG. 4 is a block diagram showing a detail of an RFID reader system, such as the one shown in FIG. 1.

FIG. 4 is a block diagram showing a detail of an RFID reader system 410, which can be the same as reader 110 shown in FIG. 1. A unit 420 is also known as a box 420, and has one or more antenna drivers 430. In some embodiments it has four drivers 430. For each driver 430 there is an output connector. The output connector is typically for a coaxial cable. Accordingly, connectors 435 can be attached to the outputs of the provided respective drivers 430, and then connectors 435 can be attached to respective antennas 440.

A driver 430 can send to its respective antenna 440 a driving signal that is in the RF range, which is why connector 435 is typically but not necessarily a coaxial cable. The driving signal causes the antenna 440 to transmit an RF wave 412, which is analogous to RF wave 112 of FIG. 1. In addition, RF wave 426 can be backscattered from the RFID tags, analogous to RF wave 126 of FIG. 1. Backscattered RF wave 426 is received by an antenna 440 and ultimately becomes a signal sensed by unit 420.

Unit 420 also has other components 450, such as hardware and/or software and/or firmware, which may be described in more detail later in this document. Components 450 control drivers 430, and as such cause RF wave 412 to be transmitted, and the sensed backscattered RF wave 426 to be interpreted. Optionally and preferably there is a communication link 425 to other equipment, such as computers and the like, for remote operation of system 410.

Figure 5:
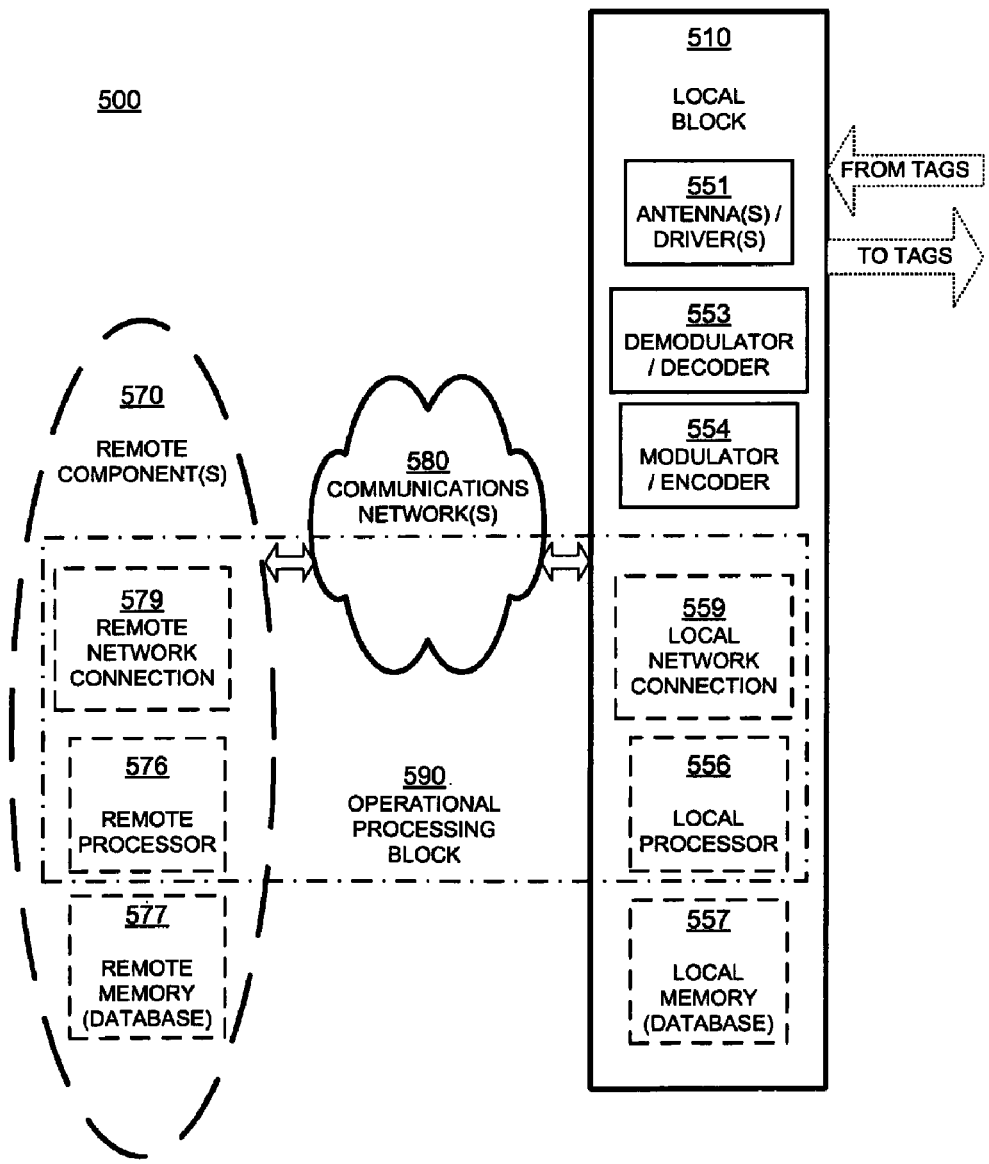
FIG. 5 is a block diagram of a whole RFID reader system according to embodiments.

FIG. 5 is a block diagram of a whole RFID reader system 500 according to embodiments. System 500 includes a local block 510, and optionally remote components 570. Local block 510 and remote components 570 can be implemented in any number of ways. It will be recognized that reader 110 of FIG. 1 is the same as local block 510, if remote components 570 are not provided. Alternately, reader 110 can be implemented instead by system 500, of which only the local block 510 is shown in FIG. 1.

Local block 510 is responsible for communicating with the tags. Local block 510 includes a block 551 of an antenna and a driver of the antenna for communicating with the tags. Some readers, like that shown in local block 510, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 553 demodulates and decodes backscattered waves received from the tags via antenna block 551. Modulator/encoder block 554 encodes and modulates an RF wave that is to be transmitted to the tags via antenna block 551.

Local block 510 additionally includes an optional local processor 556. Processor 556 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 553, the encoding function in block 554, or both, may be performed instead by processor 556. In some cases processor 556 may implement an encryption or authorization function; in some cases one or more of these functions can be distributed among other blocks such as encoding block 554, or may be entirely incorporated in another block.

Local block 510 additionally includes an optional local memory 557. Memory 557 may be implemented in any number of ways known in the art. Such ways include, by way of examples and not of limitation, nonvolatile memories (NVM), read-only memories (ROM), random access memories (RAM), any combination of one or more of these, and so on. These can be implemented separately from processor 556, or in a single chip, with or without other components. Memory 557, if provided, can store programs for processor 556 to run, if needed.

In some embodiments, memory 557 stores data read from tags, or data to be written to tags, such as Electronic Product Codes (EPCs), Tag Identifiers (TIDs) and other data. Memory 557 can also include reference data that is to be compared to the EPC codes, instructions and/or rules for how to encode commands for the tags, modes for controlling antenna 551, and so on. In some of these embodiments, local memory 557 is provided as a database. In some cases memory 557 may contain confidential information, authorization information, encryption information such as encryption keys or secrets, and the like.

Some components of local block 510 typically treat the data as analog, such as the antenna/driver block 551. Other components such as memory 557 typically treat the data as digital. At some point there is a conversion between analog and digital. Based on where this conversion occurs, a whole reader may be characterized as "analog" or "digital", but most readers contain a mix of analog and digital functionality.

If remote components 570 are indeed provided, they are coupled to local block 510 via an electronic communications network 580. Network 580 can be a Local Area Network (LAN), a Metropolitan Area Network (MAN), a Wide Area Network (WAN), a network of networks such as the internet, or a mere local communication link, such as a USB, PCI, and so on. In turn, local block 510 then includes a local network connection 559 for communicating with network 580. Communications on the network can be secure, such as if they are encrypted or physically protected, or insecure, such as if they are not encrypted or otherwise protected.

There can be one or more remote component(s) 570. If more than one, they can be located at the same location, or in different locations. They can access each other and local block 510 via network 580, or via other similar networks, and so on. Accordingly, remote component(s) 570 can use respective remote network connections. Only one such remote network connection 579 is shown, which is similar to local network connection 559, etc.

Remote component(s) 570 can also include a remote processor 576. Processor 576 can be made in any way known in the art, such as was described with reference to local processor 556. Remote processor 576 may also implement an encryption or authorization function, similar to local processor 556.

Remote component(s) 570 can also include a remote memory 577. Memory 577 can be made in any way known in the art, such as was described with reference to local memory 557. Memory 577 may include a local database, and a different database of a Standards Organization, such as one that can reference EPCs. Remote memory 577 may also contain confidential information, authorization information, encryption information, or the like, similar to local memory 557.

Of the above-described elements, it is advantageous to consider a combination of these components, designated as operational processing block 590. Block 590 includes those components that are provided of the following: local processor 556, remote processor 576, local network connection 559, remote network connection 579, and by extension an applicable portion of network 580 that links connection 559 with connection 579. The portion can be dynamically changeable, etc. In addition, block 590 can receive and decode RF waves received via antenna 551, and cause antenna 551 to transmit RF waves according to what it has processed.

Block 590 includes either local processor 556, or remote processor 576, or both. If both are provided, remote processor 576 can be made such that it operates in a way complementary with that of local processor 556. In fact, the two can cooperate. It will be appreciated that block 590, as defined this way, is in communication with both local memory 557 and remote memory 577, if both are present.

Accordingly, block 590 is location agnostic, in that its functions can be implemented either by local processor 556, or by remote processor 576, or by a combination of both. Some of these functions are preferably implemented by local processor 556, and some by remote processor 576. Block 590 accesses local memory 557, or remote memory 577, or both for storing and/or retrieving data, confidential information, passwords, authorizing information, and the like.

Reader system 500 operates by block 590 generating communications for RFID tags. These communications are ultimately transmitted by antenna block 551, with modulator/encoder block 554 encoding and modulating the information on an RF wave. Then data is received from the tags via antenna block 551, demodulated and decoded by demodulator/decoder block 553, and processed by processing block 590.

Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present disclosure.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 6:
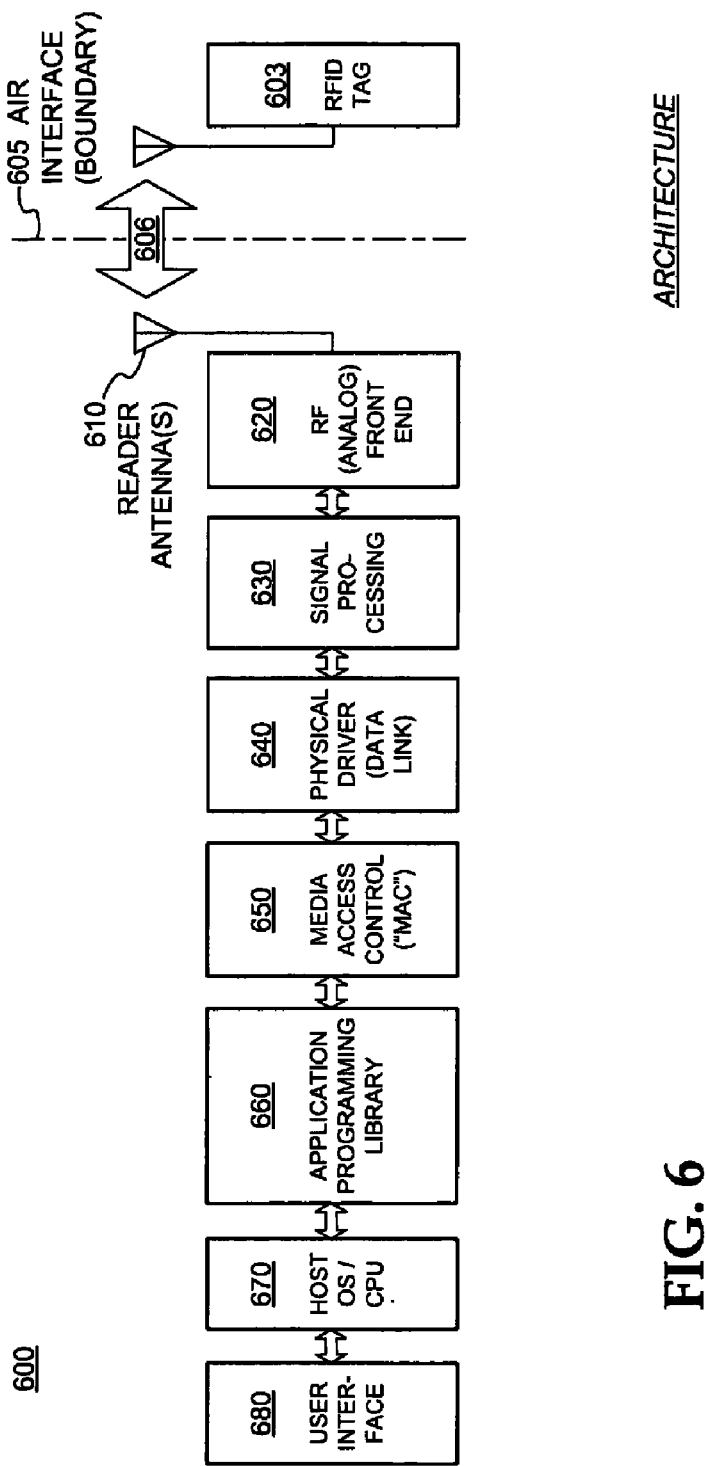
FIG. 6 is a block diagram illustrating an overall architecture of an RFID reader system according to embodiments.

FIG. 6 is a block diagram illustrating an overall architecture of an RFID system 600 according to embodiments. It will be appreciated that system 600 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 603 is considered here as a module by itself. Tag 603 conducts a wireless communication 606 with the remainder, via the air interface 605. It is noteworthy that air interface 605 is really only a boundary, in that signals or data that pass through it are not intended to be transformed from one thing to another. Specifications as to how readers and tags are to communicate with each other, for example the Gen2 Specification, also properly characterize that boundary an interface.

RFID system 600 includes one or more antennas 610, and an RF Front End 620, for interfacing with antenna(s) 610. These can be made as described above. In addition, Front End 620 typically includes analog components.

System 600 also includes a Signal Processing module 630. In this embodiment, module 630 exchanges waveforms with Front End 620, such as I and Q waveform pairs. In some embodiments, signal processing module 630 is implemented by itself in an FPGA.

System 600 also includes a Physical Driver module 640, which is also known as Data Link. In this embodiment, module 640 exchanges bits with module 630. Data Link 640 can be the stage associated with framing of data. In one embodiment, module 640 is implemented by a Digital Signal Processor.

System 600 additionally includes a Media Access Control module 650, which is also known as MAC layer. In this embodiment, module 650 exchanges packets of bits with module 640. MAC layer 650 can be the stage for making decisions for sharing the medium of wireless communication, which in this case is the air interface. Sharing can be between reader system 600 and tags, or between system 600 with another reader, or between tags, or a combination. In one embodiment, module 650 is implemented by a Digital Signal Processor. In some embodiments, many of the components of modules 620, 630, 640 and 650 can be implemented in one or two Integrated Circuit (IC) chips.

System 600 moreover includes an Application Programming Library module 660. This can include Application Programming Interfaces (APIs), other objects, etc.

All of these functionalities can be supported by one or more processors. One of these processors can be considered a host processor. Such a host processor might include a Host Operating System (OS) and/or Central Processing Unit (CPU) 670. In some embodiments, the processor is not considered as a separate module, but one that includes some of the above-mentioned modules of system 600. In some embodiments the one or more processors may manipulate confidential information, implement an authorization function, perform an encryption operation, or otherwise operate on or communicate confidential information A user interface 680 may be coupled to library 660, for accessing the APIs. User interface 680 can be manual, automatic, or both. It can be supported by the host processor mentioned above, or a separate processor, etc.

It will be observed that the modules of system 600 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 610 as signals, which are in turn processed successively by the various modules in the chain. Processing can terminate in any one of the modules. In a transmitting mode, initiation can be in any one of these modules. Ultimately, signals are routed internally, for antenna(s) 610 to transmit as wireless waves.

The architecture of system 600 is presented for purposes of explanation, and not of limitation. Its particular subdivision into modules need not be followed for creating embodiments. Furthermore, the features of the present disclosure can be performed either within a single one of the modules, or by a combination of them.

Figure 7:
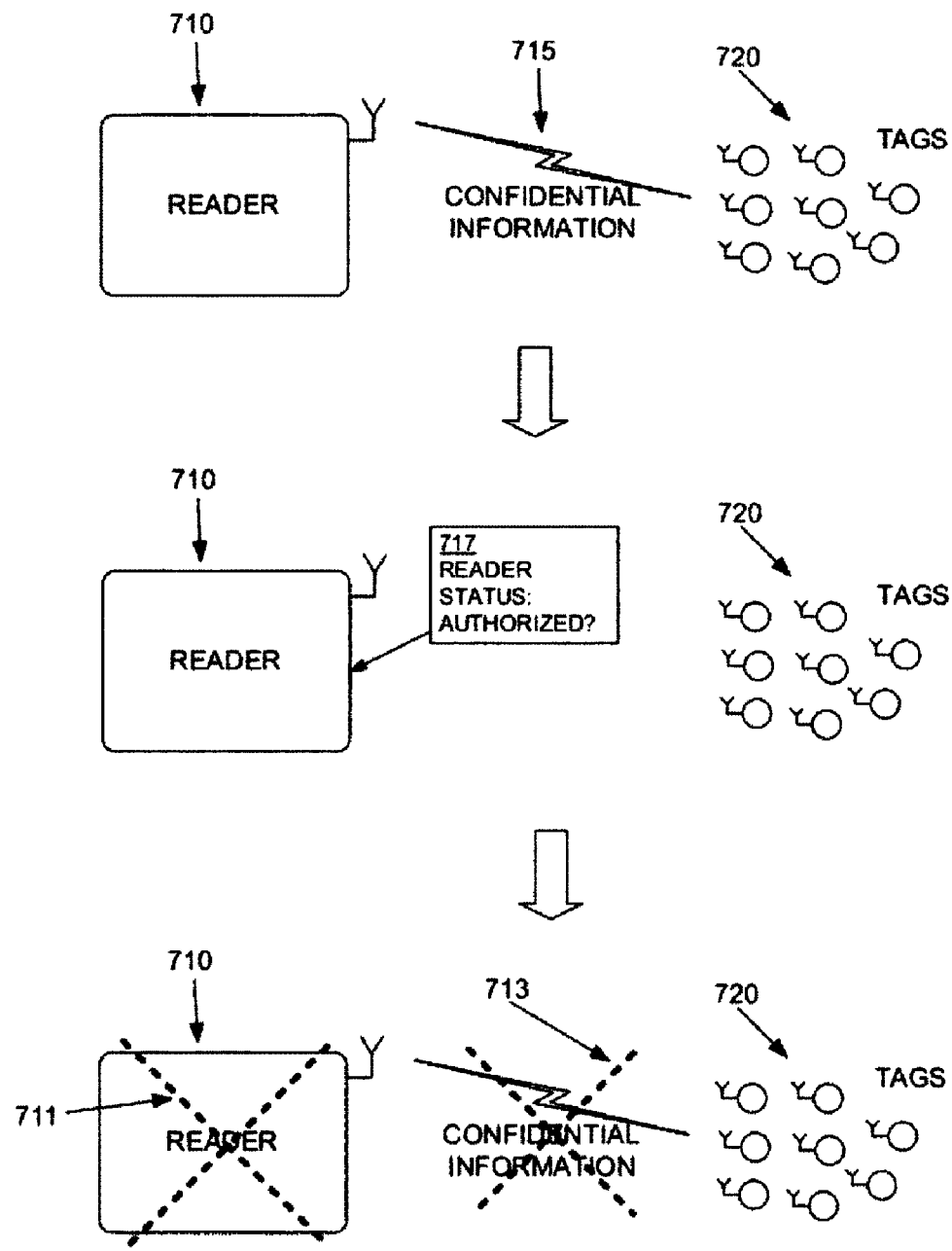
FIG. 7 is a conceptual diagram illustrating limitation of an operational aspect of an RFID reader based on self-check by the reader according to embodiments.

FIG. 7 is a conceptual diagram illustrating limitation of an operational aspect of an RFID reader based on a self-check by the reader according to embodiments. Three phases of reader operations are illustrated in diagram 700.

In the first phase, reader 710 is communicating with tags 720. The communication may include confidential information 715 such as a password, a shared secret, a confidential command, an encryption key, and/or similar information.

At the next phase, reader 710 determines its authorization status (717) based on a self-check process. The self-check process may include verifying the presence of communications with a network, a validity of a reader registration, a validity of a timestamp, a connection status of a hardware key during reader operation, a connection status of a hardware key during reader power-up, an indicator relative to a threshold, or similar aspects of reader operations.

Determination of the authorization status of the reader may also include prompting a user to enter a password, the reader having been powered down or taken off-line unexpectedly, the reader being connected to the wrong network, and the like.

If the reader determines that it is not authorized, it may limit an aspect of its operations at the third phase, effectively terminating or reducing its communication of confidential information with the tags. Such a termination of communications would also prevent an illicit user from acquiring the confidential information, such as might otherwise happen, for example, if the illicit user had stolen the reader. The limiting may involve an internal operation of the reader such as disabling a memory of the reader, disabling a power management unit of the reader, destroying or rendering secure a program or data stored in the reader for deriving the confidential information, or similar aspects. Reader 710 may also limit (or terminate) its wireless communication capability (as shown by reference numeral 713) such that a range for communication with the tags 720 is restricted or a number of communications to the tags for issuing the confidential information is reduced.

Figure 8:
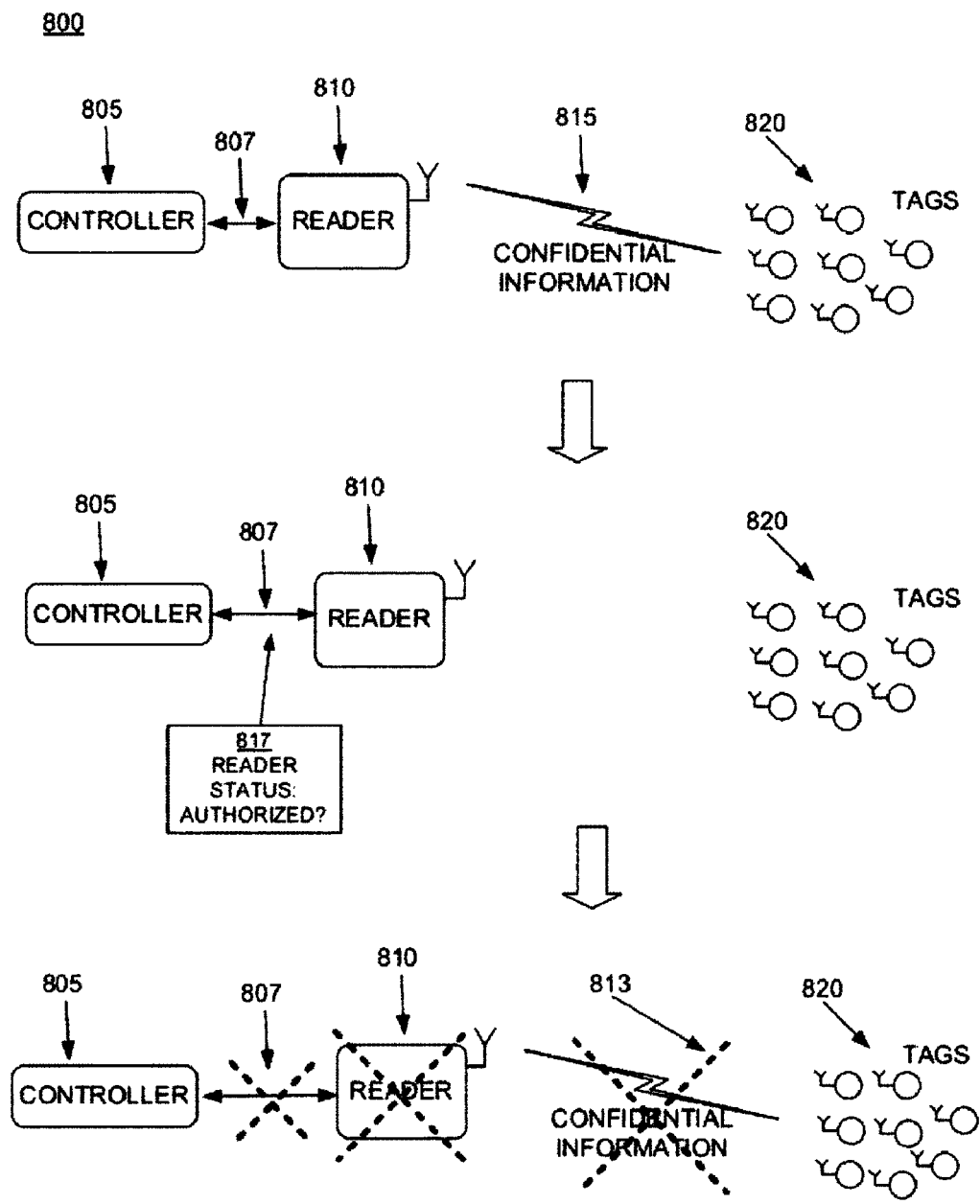
FIG. 8 is a conceptual diagram illustrating limitation of an operational aspect of an RFID reader and communication between the reader and a controller based on a determination by the controller according to embodiments.

FIG. 8 is a conceptual diagram illustrating limiting an operational aspect of an RFID reader and communication between the reader and a controller based on a determination by the controller according to embodiments.

Differently from FIG. 7, reader 810 in diagram 800 communicates (807) with controller 805, receiving operational and other data. Information received from controller 805 may include the confidential information 815 to be issued to tags 820, data to enable the reader to derive the confidential information 815, or an authorization allowing reader 810 to generate or communicate confidential information 815.

At a second phase of operations according to the embodiment illustrated in diagram 800, controller 805 determines reader 810's authorization status (817) as discussed above or through additional means such as detecting an unexpected power down of the reader, etc.

Upon determining the reader is unauthorized, controller 805 may limit issuance of confidential information by disabling or reducing: communications (807) with reader 810, an operational aspect of reader 810, or the issuance of confidential information 815 (as shown by reference numeral 813) to the tags. Controller 805 may accomplish this, among other things, by transmitting specific commands to the reader 810 or by not communicating or disabling an authorization to reader 810. Controller 805 may limit the issuance of confidential by the reader temporarily (until next authorizing attempt) or permanently.

Figure 9:
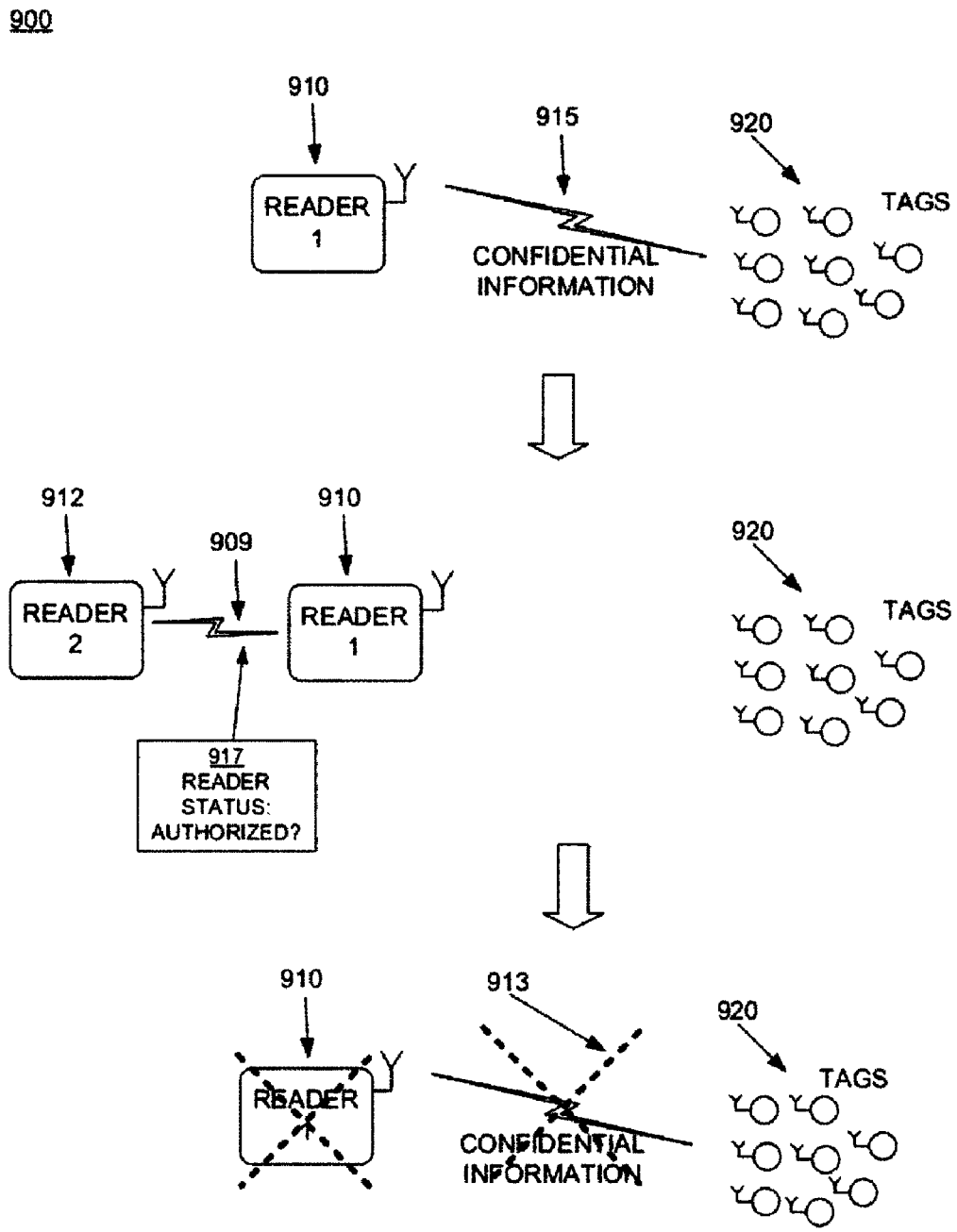
FIG. 9 is a conceptual diagram illustrating limitation of an operational aspect of an RFID reader based on a check by another reader according to embodiments.

FIG. 9 is a conceptual diagram illustrating limiting an operational aspect of an RFID reader based on a check by another reader according to embodiments. The components involved in communication with tags 920 of reader 910, which includes issuing of confidential information to the tags, are in many aspects similar to those discussed in FIG. 7 and FIG. 8.

Differently from the previous two figures, reader 910 is part of a multi-reader system, which is common in many installations. As shown in the second phase of diagram 900, a second reader 912 of the reader system may communicate (909) with reader 910 and assist reader 910 to determine its authorization status (917). This assistance may be in form of issuing a challenge to reader 910, exchanging a password, a secret, an authorization, or a similar process. The challenge may include a password, a shared secret, and an encryption/decryption key, or a number that the reader has to convert properly and send back to the controller. The challenge may further include a message that the reader has to encrypt properly and send back to the controller, or other similar challenge-response mechanisms.

Upon determining itself to be unauthorized, reader 910 may limit an operational aspect (e.g. issuing of confidential information to tags 920) as discussed previously. Alternatively, reader 912 may be programmed to instruct reader 910 to limit its operational aspect(s) upon discovering reader 910 not to be authorized.

Embodiments also include methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some of them. These human operators need not be collocated with each other, but each can be only with a machine that performs a portion of the program.

Figure 10:
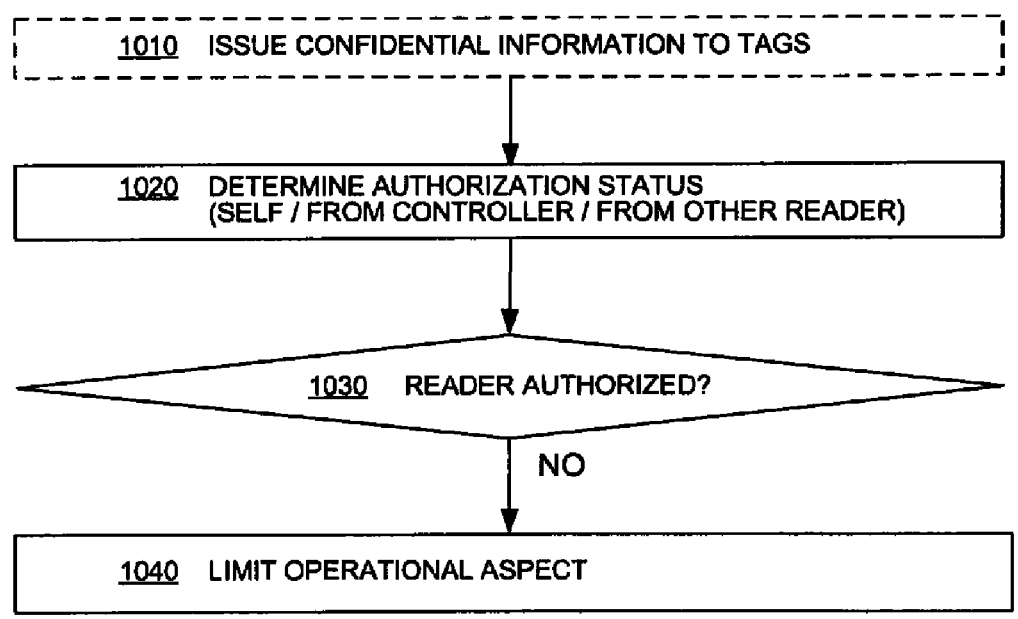
FIG. 10 is a flowchart for a process of limiting a reader's operational aspects by the reader based on the reader's authorization status.

FIG. 10 is a flowchart for a process of limiting a reader's operational aspects by the reader based on the reader's authorization status. Process 1000 may begin with optional step 1010, where confidential information such as a password, a shared secret, a confidential command, and/or an encryption key is issued by the reader to tags. The confidential information may be derived by the reader from a mathematical function and/or a look-up table, and it may be updated in response to an expiration of a predefined period, a number of confidential transactions, an authorization value, and/or a command from a controller. The mathematical function and the lookup table may be stored in the reader or the controller.

At step 1020, an authorization status of the reader is determined by the reader through a self-check process, communication with a controller, or communication with another reader (or a combination of those). The self-check process may include verifying a presence of communication with a network, a validity of a reader registration, a validity of a timestamp, a connected status of a hardware key during reader operation, a connected status of a hardware key during reader power-up, and/or an indicator relative to a threshold. The authorization status of the reader may also be determined based on verification of communication with an authorizing tag within the reader's field of view. The indicator relative to the threshold may include a count of confidential transactions, a time, or an authorization value.

The communication with the controller and the communication with the other reader in step 1020 may be a wired communication or a wireless communication. Furthermore, the authorization status of the reader may be determined based upon expiration of a predefined period, detection of illicit activity, detection of a power cycling, or a user input.

If the reader is determined not to be authorized at decision step 1030, processing advances to step 1040, where an operational aspect of the reader is limited. Limiting the operational aspect of the reader may include disabling a memory storage of the reader, disabling a wireless communication capability of the reader, and/or disabling a power management unit of the reader. The limiting act may be reversible or irreversible. Moreover, limiting the operational aspect of the reader may include destroying or rendering secure a program stored in the reader for deriving the confidential information, a data file stored in the reader for deriving the confidential information, and/or a portion of contents of a data file stored in the reader for deriving the confidential information.

Limiting the operational aspect of the reader may also include reducing the RF power of the reader such that a range for communication with the tags is restricted or reducing a number of communications to the tags for issuing the confidential information.

Figure 11:
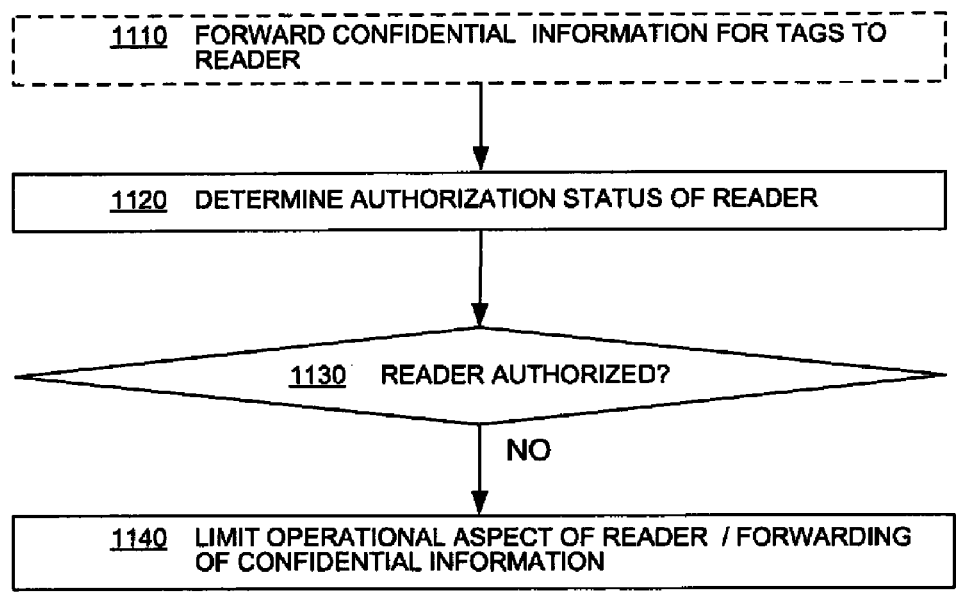
FIG. 11 is a flowchart for a process of limiting a reader's operational aspects by a controller based on the reader's authorization status.

FIG. 11 is a flowchart for a process of limiting a reader's operational aspects by a controller based on the reader's authorization status. Process 1100 is in some ways similar to process 1000. Differently from process 1000, however, process 1100 begins with optional step 1110, where the confidential information for the tags is forwarded to the reader from a controller.

Steps 1120 and 1130 are similar to steps 1020 and 1030 for process 1000, where the authorization status of the reader is determined. Differently from process 1000, the determination may be performed by the controller in this case based on communication with the reader. The controller may also receive a communication from the reader indicating that the reader itself has determined its status to be unauthorized.

If the reader's status is determined to be unauthorized, an operational aspect of the reader or forwarding of the confidential information is limited at step 1140. The operational aspect of the reader may be limited by a command from the controller or by terminating an authorization from the controller. Forwarding of confidential information may also include complete termination of communication with the reader, reduction of communication such that a limited number of passwords may be issued, or similar actions.

The operations included in processes 1000 and 1100 are for illustration purposes. Limiting theft of confidential information in an RFID system may be implemented by similar processes with fewer or additional steps, as well as in different order of operations using the principles described herein.

The above described features can be implemented by a so-called utility of an RFID reader. For example, a utility can include one or more of the above described components, operational processing blocks, an article of manufacture, etc.

The invention further provides interfacing, to expose a functionality of this utility to an agent, as is described in more detail below.

Figure 12:
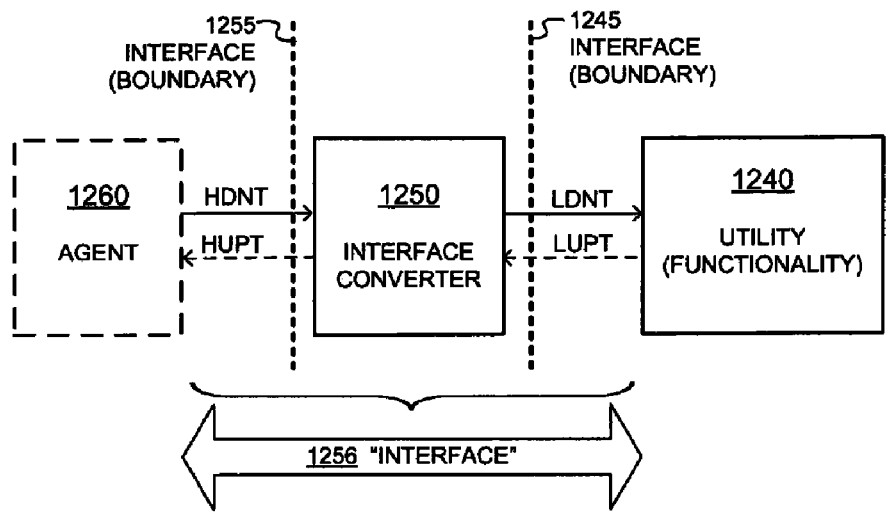
FIG. 12 is a block diagram illustrating an architecture for an interface converter according to embodiments.

FIG. 12 is a block diagram illustrating an architecture 1200 for an interface converter according to embodiments. Architecture 1200 includes a utility 1240, which is a mechanism for performing some or all of the reader features described above.

More particularly, utility 1240 may determine the reader's authorization status and limit an operational aspect of the reader, as discussed previously, upon determining the reader to be unauthorized.

Architecture 1200 additionally includes an interface converter 1250, and an agent 1260. Agent 1260, interface converter 1250, and utility 1240 can be implemented in any way known in the art. For example, each can be implemented in hardware, middleware, firmware, software, or any combination thereof. In some embodiments, agent 1260 is a human.

Embodiments also include interface converter 1250, and methods of operation of an interface converter such as interface converter 1250. Interface converter 1250 thus enables agent 1260 to control utility 1240. Interface converter 1250 is so named because it performs a conversion, a change, as will be described in more detail below.

Between interface converter 1250 and agent 1260 and utility 1240 there are respective boundaries 1255, 1245. Boundaries 1255, 1245 are properly called interfaces, in that they are pure boundaries, as is the above described air interface.

In addition, it is a sometimes informal usage to call the space between boundaries 1255 and 1245, which includes interface converter 1250, an "interface" 1256. Further, it is common to designate this space with a double arrow as shown, with an understanding that operations take place within the arrow. So, while "interface" 1256 is located at a boundary between agent 1260 and utility 1240, it is not itself a pure boundary. Regardless, the usage of "interface" 1256 is so common for interface converter 1250 that this document sometimes also refers to it as an interface. It is clear that embodiments of such an "interface" 1256 can be included in this invention, if they include an interface converter that converts or alters one type of transmission or data to another, as will be seen below.

Agent 1260 can be one or more layers in an architecture. For example, agent 1260 can be something that a programmer programs to. In alternative embodiments, where agent 1260 is a human, interface converter 1250 can include a screen, a keyboard, etc. An example is now described.

Figure 13:
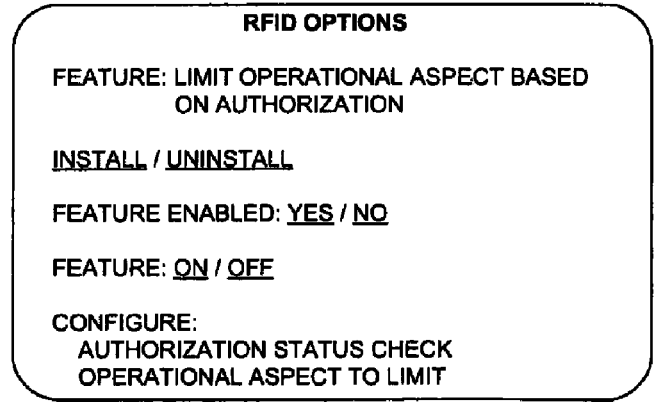
FIG. 13 is a sample screenshot of an interface converter such as the interface converter of FIG. 12, according to an embodiment.

FIG. 13 is a sample screenshot 1350 of an interface converter, such as the interface converter of FIG. 12. Screenshot 1350 can be that of a computer screen for a human agent, according to an embodiment. What is displayed in screenshot 1350 exposes the functionality of a utility, such as utility 1240. Inputs by the user via a keyboard, a mouse, etc., can ultimately control utility 1240. Accordingly, such inputs are received in the context of screenshot 1350. These inputs are determined from what is needed for controlling and operating utility 1240. An advantage with such interfacing is that agent 1260 can prepare RFID applications at a higher level, without needing to know how to control lower level RFID operations. Such lower level RFID operations can be as described in the Gen2 Spec, in other lower level protocols, etc. Utility 1240 can be controlled in any number of ways. Some such ways are now described.

Returning to FIG. 12, interface converter 1250 can be implemented in any number of ways. One such way is as a software Application Programming Interface (API). This API can control or provide inputs to an underlying software library, and so on.

Transmissions can be made between agent 1260, interface converter 1250, and utility 1240. Such transmissions can be as input or can be converted, using appropriate protocols, etc. What is transmitted can encode commands, data, etc. Such transmissions can include any one or a combination of the following: a high down transmission HDNT from agent 1260 to interface converter 1250; a low down transmission LDNT from interface converter 1250 to utility 1240; a low up transmission LUPT from utility 1240 to interface converter 1250; and a high up transmission HUPT from interface converter 1250 to agent 1260. These transmissions can be spontaneous, or in response to another transmission, or in response to an input or an interrupt, etc.

Commands are more usually included in transmissions HDNT and LDNT, for ultimately controlling utility 1240. Controlling can be in a number of manners. One such manner can be to install utility 1240, or just a feature of it. Such installing can be by spawning, downloading, etc. Other such manners can be to configure, enable, disable, or operate utility 1240, or just a feature of it. These commands can be standalone, or carry parameters, such as data, confidential information, etc. In some embodiments interface converter 1250 can convert these commands to a format suitable for utility 1240.

Data is more usually included in transmissions HUPT and LUPT. The data can inform as to success or failure of executing an operation. The data can also include tag data, which can be both codes read from tags, including confidential information, and data about reading tags, such as time stamps, date stamps, etc. In some embodiments interface converter 1250 can convert the data to a format suitable for agent 1260, including in some cases aggregating, filtering, merging, or otherwise altering the format or utility of the data.

It should be noted that, what passes across a single pure boundary can be unchanged, by the mere definition of what is a pure boundary. But what passes through interface converter 1250 can be changed or not. More particularly, high down transmission HDNT can be being encoded similarly to, or differently from, low down transmission LDNT. In addition, low up transmission LUPT can be encoded similarly to, or differently from, high up transmission HUPT. When different, it can be attributed to interface converter 1250, which performs a suitable change, or conversion, of one transmission to another. The change, or conversion, performed by interface converter 1250 is for exposing the functionality of utility 1240 to agent 1260, and vice versa. In some embodiments, a command is converted, but a parameter is passed along without being converted. Plus, what is not converted at one module may be converted at another. Such modules taken together can also form an interface converter according to embodiments.

Figure 14:
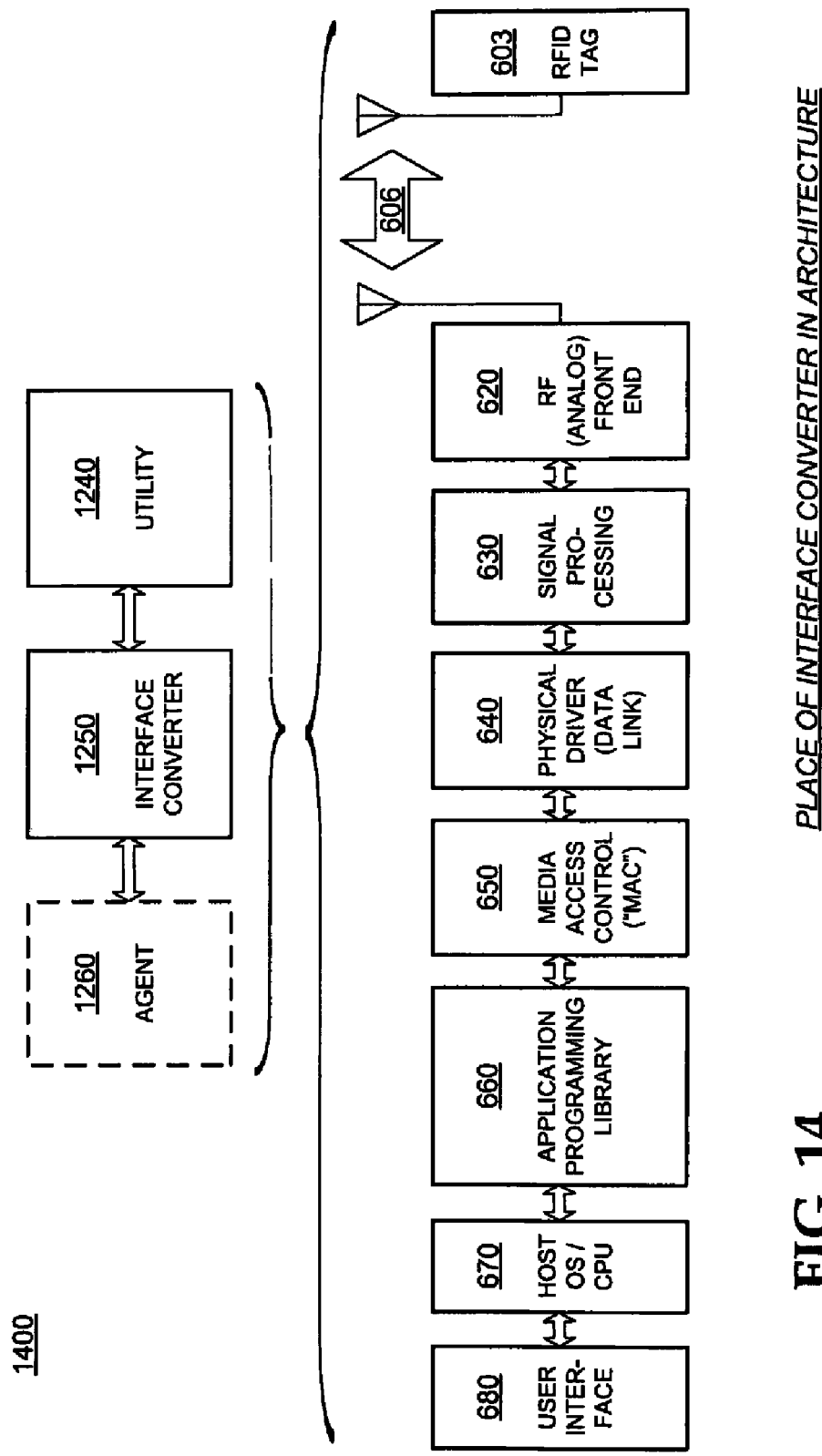
FIG. 14 is a diagram for showing a correspondence for how components of FIG. 12 can be implemented by those of FIG. 6, in embodiments where the interface converter is implemented by a reader.

Agent 1260, interface converter 1250, and utility 1240 can be implemented as part of a reader, or as a different device. For being implemented as part of a reader, FIG. 14 suggests a scheme 1400 where agent 1260, interface converter 1250, and utility 1240 can be implemented in connection with respective reader modules that are suitable, depending on the requirements.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

We claim:

1. A method for protecting confidential information from being issued in communication between a Radio Frequency Identification (RFID) reader and an RFID tag, the method comprising:
   determining an authorization status of the reader at the reader; and
   if the reader is not authorized, limiting an operational aspect of the reader associated with issuing of confidential information wirelessly to the tag.

2. The method of claim 1, wherein the authorization status of the reader is determined based on at least one from a set of:
   a self-check process;
   a communication with a controller; and
   a communication with another reader.

3. The method of claim 2, wherein the communication with the controller and the communication with the other reader are one of: a wired communication and a wireless communication.

4. The method of claim 2, wherein the authorization status of the reader is determined based upon one of: expiration of a predefined period at the reader, detection of illicit activity by the reader, detection of a power cycling of the reader, and a user input to the reader.

5. The method of claim 1, wherein the confidential information includes at least one from a set of: a password, a shared secret, a confidential command, and an encryption key.

6. The method of claim 5, wherein the confidential information is derived by the reader from at least one of: a mathematical function and a look-up table.

7. The method of claim 6, wherein the deriving is updated in response to at least one from a set of: an expiration of a predefined period, a number of confidential transactions, an authorization value, and a command from a controller.

8. The method of claim 6, wherein the at least one of the mathematical function and lookup table is stored in one of: the reader and a controller.

9. The method of claim 1, wherein limiting the operational aspect of the reader includes at least one from a set of:
   disabling a memory storage of the reader;
   disabling a wireless communication capability of the reader; and
   disabling a power management unit of the reader.

10. The method of claim 9, wherein limiting the operational aspect of the reader is reversible.

11. The method of claim 9, wherein limiting the operational aspect of the reader is irreversible.

12. The method of claim 1, wherein limiting the operational aspect of the reader includes one of destroying and rendering secure at least one from a set of:
   a program stored in the reader for deriving the confidential information;
   a data file stored in the reader for deriving the confidential information; and
   a portion of contents of a data file stored in the reader for deriving the confidential information.

13. The method of claim 1, wherein limiting the operational aspect of the reader includes at least one from a set of:
   reducing RF power of the reader such that a range for communication with the tag is restricted; and
   reducing a number of communications to the tag for issuing the confidential information.

14. A Radio Frequency Identification (RFID) reader configured to communicate with an RFID tag, the reader comprising:
   a transceiver arranged to transmit and receive a modulated wave for communicating with the tag;
   a processing block coupled to the transceiver, the processing block arranged to:
      determine an authorization status of the reader; and
      if the reader is not authorized, limit an operational aspect of the reader associated with issuing of confidential information wirelessly to the tag.

15. The reader of claim 14, wherein the processing block is further arranged to determine the authorization status of the reader employing at least one from a set of:
   a self-check process;
   a communication with a controller through one of: a wired communication and a wireless communication;
   a communication with another reader;
   determination of an expiration of a predefined period at the reader;
   detection of illicit activity by the reader;
   detection of a power cycling of the reader; and
   a user input to the reader.

16. The reader of claim 14, wherein the confidential information includes at least one from a set of: a password, a shared secret, a confidential command, and an encryption key, and wherein the confidential information is derived by the reader from at least one of: a mathematical function and a look-up table, stored in one of: the reader and a controller.

17. The reader of claim 16, wherein the deriving is updated in response to at least one from a set of: an expiration of a predefined period, a number of confidential transactions, an authorization value, and a command from a controller.

18. The reader of claim 14, wherein the processing block is further arranged to limit the operational aspect of the reader by at least one from a set of:
   disabling a memory storage of the reader;
   disabling a wireless communication capability of the reader;
   disabling a power management unit of the reader;
   reducing RF power of the reader such that a range for communication with the tag is restricted;
   reducing a number of communications to the tag for issuing the secure information; and
   one of destroying and rendering secure of at least one from a set of:
      a program stored in the reader for deriving the confidential information;
      a data file stored in the reader for deriving the confidential information; and
      a portion of contents of a data file stored in the reader for deriving the confidential information.

19. The reader of claim 18, wherein the processing block is arranged to limit the operational aspect of the reader irreversibly.

* * * * *